(No Model.)

W. A. CONNER.
ELECTRIC CABLE.

No. 452,340. Patented May 12, 1891.

WITNESSES:
Danron b. Wolcott
F. E. Gaither.

INVENTOR,
William A. Conner
by George H. Christy
Att'y.

UNITED STATES PATENT OFFICE.

WILLIAM A. CONNER, OF PITTSBURG, PENNSYLVANIA, ASSIGNOR TO THE STANDARD UNDERGROUND CABLE COMPANY, OF SAME PLACE.

ELECTRIC CABLE.

SPECIFICATION forming part of Letters Patent No. 452,340, dated May 12, 1891.

Application filed July 24, 1890. Serial No. 359,715. (No model.)

*To all whom it may concern:*

Be it known that I, WILLIAM A. CONNER, a citizen of the United States, residing at Pittsburg, in the county of Allegheny and State of Pennsylvania, have invented or discovered certain new and useful Improvements in Electric Cables, of which improvements the following is a specification.

The invention described herein relates to certain improvements in the manufacture of electric cables, and has for its object the production of a cable wherein the conductors are insulated from each other not only by a fibrous covering, but also by air or gas or a mixture of air and gas contained in interstices in the fibrous covering of each conductor, and also between the several conductors forming the cable; and it is a further object of this invention to form a seal at suitable intervals along the length of each cable or section thereof, so as to prevent, in case of a break in one portion of the cable or section thereof, the escape of the air or gas from its entire length, and also the penetration of moisture throughout the entire length thereof.

Figure 1:
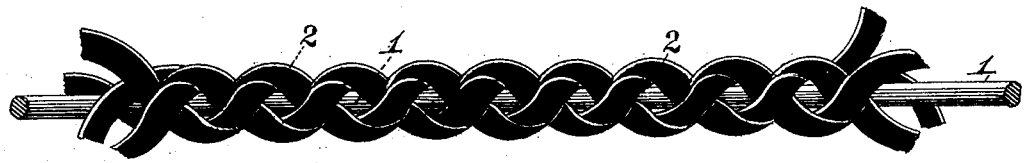
Figure 2:
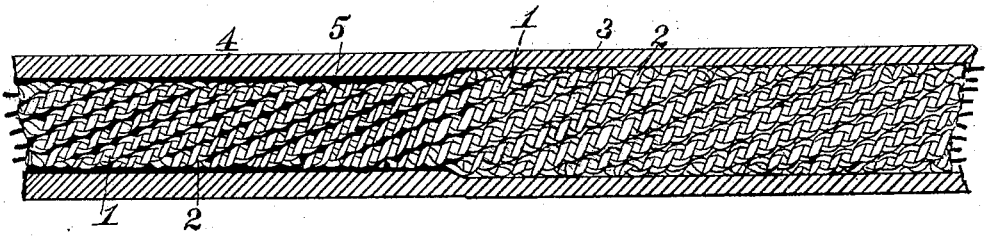

In the accompanying drawings, forming a part of this specification, Figure 1 is an elevation of a single insulated wire, and Fig. 2 is in sectional elevation a portion of a cable constructed in accordance with my invention.

In the practice of my invention the wires or conductors 1 are covered with a suitable fibrous covering 2, as jute, hemp, cotton, paper, &c., preferably jute or hemp braided or wound spirally around the wires with such looseness as to provide interstices or openings in such covering. The wires are then laid up in core either with the wires parallel or twisted together in pairs. The core thus formed is then immersed in a bath of paraffine, asphaltum, petroleum, pitch, or other suitable insulating-liquid, so that the fibrous covering may be thoroughly saturated therewith. This liquid insulating material should be so prepared, either by heating to a high temperature or otherwise, as to be in a very fluid condition, in order that all surplus thereof may drain off the core when lifted from the bath, and not collect and solidify in the interstices of the fibrous covering. The purpose of this immersion is to saturate the fibrous covering without obliterating the interstitial character of the covering. After the surplus insulating material has drained off the core is passed through a lead-press, so as to form a protecting covering 3 thereon.

In order to insure the filling of all openings in the core with air or gas, either dry air or gas or a mixture of the two may be forced into the core-bar of the press during the passage of the core therethrough.

In order to prevent the escape of the air from the cable, the ends thereof are closed or sealed by so adjusting the press, in a manner well known in the art, that the lead will be forced tightly against the core, thereby compressing the conductors so closely together and causing the lead to hug the core so snugly as to form an air-tight seal, as at 4, Fig. 2. This sealing is effected for a distance of two or three feet (more or less) at each end of every section of cable, and also at suitable intervals—say of forty or fifty feet, more or less—along the length of each section. The press is adjusted for a comparatively loose application of the lead covering, except at the points of sealing, as otherwise all air would be forced out of the core and its entrance in the manner described effectually prevented.

If desired, a sealing material, (shown at 5,) as paraffine, ozite, &c., may be forced into the core-bar of the press when the latter is adjusted to compress the head against the core. This material, being thus forced around and through the core, will form a more effective seal than the lead alone.

I claim herein as my invention—

1. An electric cable having its wires covered with saturated fibrous material so applied as to form an open mesh, thus providing air-spaces, substantially as forth.

2. In an electric cable, the combination of a series of two or more wires covered with saturated fibrous material so applied as to form an open mesh, thus providing air-spaces, and a lead sheath for said wires, substantially as set forth.

3. In an electric cable, the combination of a series of two or more wires covered with saturated fibrous material, and a lead sheath for said wires, the lead sheath tightly compressing the wires at intervals, thus sealing the cable as against the escape of air and access of moisture, substantially as set forth.

4. In an electric cable, the combination of a series of two or more wires covered with saturated fibrous material so applied as to form an open mesh, thus providing air-spaces, a lead sheath tightly compressing the wires at intervals, and a sealing material surrounding the wires at the points of lead compression, substantially as set forth.

5. As an improvement in the art of manufacturing electric cables, the method herein described, which consists in forming an open-meshed fibrous covering around each wire, laying up a series of two or more of such covered wires into a core, dipping the core thus formed in a bath of insulating material of suitable fluidity, so as to drain off from the core when raised from the bath, thereby saturating the fibrous covering without filling the interstices therein, and then covering the core with an air and moisture proof sheath, substantially as set forth.

6. As an improvement in the art of manufacturing electric cables, the method herein described, which consists in forming an open-meshed fibrous covering around each wire, laying up a series of two or more of such covered wires into a core, dipping the core in a bath of insulating material of suitable fluidity, so as to drain off from the core when raised from the bath, thereby saturating the fibrous covering without filling the interstices therein, covering the core with a lead sheath, forcing air or gas or a mixture thereof between the core and the lead sheath, and sealing the cable-section at intervals, substantially as set forth.

7. As an improvement in the art of manufacturing electric cables, the method herein described, which consists in forming an open-meshed fibrous covering around each wire, laying up a series of two or more of such covered wires into a core, dipping the core in a bath of insulating material of suitable fluidity, so as to drain off from the core when raised from the bath, thereby saturating the fibrous covering without filling the interstices therein, covering the core with a lead sheath, and compressing said sheath against the core at intervals, substantially as set forth.

In testimony whereof I have hereunto set my hand.

WILLIAM A. CONNER.

Witnesses:
W. B. CORWIN,
DARWIN S. WOLCOTT.